United States Patent
Kallabis

(10) Patent No.: US 7,167,500 B2
(45) Date of Patent: Jan. 23, 2007

(54) LASER APPARATUS SUCH AS A CONSTRUCTION LASER APPARATUS

(75) Inventor: Gabriel Kallabis, Spirkelbach (DE)

(73) Assignee: STABILA Messgeräte Gustav Ullrich GmbH, Annweiler (DE)

( * ) Notice: Subject to any disclaimer, the term of this patent is extended or adjusted under 35 U.S.C. 154(b) by 229 days.

(21) Appl. No.: 10/465,651

(22) Filed: Jun. 20, 2003

(65) Prior Publication Data

US 2004/0064959 A1    Apr. 8, 2004

(30) Foreign Application Priority Data

Jun. 25, 2002   (DE)   ............................ 202 09 856 U

(51) Int. Cl.
*H01S 3/08* (2006.01)
*G01C 15/00* (2006.01)

(52) U.S. Cl. .......................... 372/107; 33/286

(58) Field of Classification Search ................ 33/286, 33/290; 372/107
See application file for complete search history.

(56) References Cited

U.S. PATENT DOCUMENTS

| | | | | |
|---|---|---|---|---|
| 4,142,798 A | * | 3/1979 | Barbee, Jr. ................. | 356/138 |
| 5,572,796 A | * | 11/1996 | Breda ........................... | 33/283 |
| 6,052,911 A | * | 4/2000 | Davis ........................... | 33/286 |
| 6,088,623 A | * | 7/2000 | Yowler et al. ................ | 700/56 |
| 6,195,901 B1 | * | 3/2001 | Falb ............................. | 33/286 |

FOREIGN PATENT DOCUMENTS

| | | |
|---|---|---|
| CH | 688902 | 10/1994 |
| DE | 19757957 | 7/1999 |
| DE | 29914297 | 1/2000 |
| JP | 59135309 | 8/1984 |

* cited by examiner

*Primary Examiner*—Armando Rodriguez
(74) *Attorney, Agent, or Firm*—Dennison, Schultz & MacDonald

(57) ABSTRACT

The invention relates to a laser apparatus as construction laser apparatus (10) comprising a light source accommodated inside a housing (12). For providing an increased protection of the apparatus and for adjusting the housing and thus the laser plane to the desired extent with constructive simple measurements, it is suggested that the housing (12) is enclosed by a receiving means (14), along which said housing (12) of the laser is arranged in adjustable manner.

33 Claims, 5 Drawing Sheets

LASER APPARATUS SUCH AS A CONSTRUCTION LASER APPARATUS

The invention herein relates to a laser apparatus, such as a construction laser apparatus, comprising a light source accommodated inside a housing.

BACKGROUND OF THE INVENTION

Construction laser apparatus—also referred to as construction lasers—can be used to exactly determine lines extending along the appropriate planes on buildings, for example, on ceilings or walls, or in rooms. Such construction lasers comprise a housing accommodating a laser for the emission of light to create lines or dots. In doing so, the laser beam may optionally be emitted in a rotating manner, for example, with the use of a prism.

Frequently, it is necessary to bring the light emitted by the laser to a predetermined intensity level in order to transfer existing projection marks or to achieve a fixed-distance measurement for simple manipulation. To do so, the height adjustment may be achieved by placing the housing of the laser on the crank-operated center column of a stand. Crank-operated columns have the disadvantage that they are relatively expensive.

Furthermore, there is the disadvantage that the housing can be adjusted only in vertical direction but not horizontally. If horizontal movement is required, the housing must be moved together with the stand.

It has been found that, in particular when used on construction sites, a laser apparatus may be damaged by being inadvertently tipped over, even if the laser housing consists of metal.

Document DE 299 14 299 U1 discloses a laser-leveling device. This instrument comprises a main housing which can be aligned with three coordinate directions that are offset by 90° relative to each other.

Document CH 688 902 discloses a portable measuring instrument for aligning a rail, said instrument comprising a housing that is located on a rod-shaped vertical support for alignment in horizontal direction.

Document DE 197 57 957 discloses a leveling system on a revolving table to improve positioning accuracy.

SUMMARY OF THE INVENTION

The present invention is to solve the problem of modifying a laser apparatus of the aforementioned type in such a manner that on one hand better protection of the apparatus is ensured, and that on the other hand adjustment of the housing, and hence the laser plane, is possible by means of simple design measures.

In accordance with the invention herein, this problem has been solved essentially in that the housing of the laser apparatus is at least partially enclosed by a receiving frame, along which the housing of the laser can be arranged in a movable manner.

Therefore, in accordance with the invention herein, the housing which encloses the light source is, in turn, enclosed by a type of second housing or frame configured as a receiving means, thus providing added protection. At the same time, this receiving means offers the option of adjusting the housing in its longitudinal direction so that, depending on the position of said receiving means relative to a stand, for example, a vertical or horizontal adjustment of the housing is possible, without requiring an adjustment to the stand itself. Furthermore, this does not require a crank-operated central column.

The receiving means may comprise two mounting elements, such as threaded connections for a stand, whereby their longitudinal axes extend in a vertical direction relative to each other. In conjunction with this, a special feature is that the receiving means comprises a base plate from which, or from an extension of which, extends a mounting element such as the threaded connection.

Further developments of the invention provide that a plate-shaped mounting support is arranged in such a manner that it can be moved along the receiving means, in which said mounting support the housing of the laser apparatus is supported, in particular in a manner so that it can be pivoted or panned.

To do so, a bottom-side section of the housing, configured at least partially as a spherical section or cap-shaped section, can come into engagement with an appropriately adapted recess or seat of the mounting support.

In particular, the mounting support consists of a shell having the shape of a hollow cylinder which represents the external section and of an insert accommodating the housing which represents the internal section provided with noses which extend in the direction of the housing for engagement in a preferably peripherally extending recess, such as a groove of the spherical section or cap-shaped section of the housing, in order to permit a rotation of the housing about its longitudinal axis without creating the risk of tipping over the apparatus.

To do so, the noses may extend from strip-shaped sections of the insert, said strip-shaped sections extending along the longitudinal direction of the receiving means. As a result of this, sufficient flexibility is provided, allowing that the housing can optionally be tilted to the desired degree, whereby the noses are not in engagement with the specifically peripheral groove of the housing. In doing so, the strip-shaped sections represent, in particular, cutouts of the insert.

Preferably, the receiving means comprises rods or at least one bracket extending from the base plate, whereby said rods or said at least one bracket form a frame which protects the housing of the laser apparatus.

If one bracket is used—preferably two brackets are used—said bracket or brackets act as a handle.

Independent thereof, each bracket has the geometric configuration of a U-shape with lateral legs extending from the base plate and with a transverse leg following a circular arc. In doing so, at least one cushioning element, such as a rubber element, may extend from or enclose the transverse leg, which provides cushioning of shock-like effects which occur when the laser apparatus is dropped.

The mounting support that accommodates the housing can be moved along rods or longitudinal legs and fixed in position relative to said rods or legs.

If two brackets extend from the base plate, the arrangement is such that one longitudinal leg of one bracket extends directly adjacent to one longitudinal leg of the other bracket. In doing so, the adjacent longitudinal legs forming a pair of legs, as well as the additional longitudinal legs, extend along the edges of a three-square column, specifically a roof prism.

The longitudinal legs or the pair of legs extend through the mounting support of the housing and can be fixed in position relative to said legs by means of a locking element such as a screw.

The base plate itself may be provided with support feet. Furthermore, the base plate may be enclosed by cushioning elements such as rubber elements in some areas, specifically in the areas of the support feet, in order to achieve shock absorption.

In accordance with an alternative suggestion, the receiving means has the geometric configuration of a U-shaped element, such as an appropriately shaped aluminum element which partially encloses the housing of the laser apparatus. However, instead of the U-shape, a section configured as a hollow cylinder, which is open on the periphery, can be used.

The structural element should have a longitudinal hole extending in longitudinal direction, whereby a locking element such as a screw comes into engagement with said hole and is used to fix the housing in position. Furthermore, guides for the housing may extend from the internal walls, for example, whereby said guides may have the form of studs that come into engagement with appropriately adapted recesses of the housing, or vice versa.

Regardless of whether or not the receiving means is configured as a frame or as a partially closed structural element, said receiving means should enclose the housing of the laser apparatus—at least partially—in a coaxial or in an approximately coaxial direction in order to provide adequate protection.

Additional details, advantages and features of the invention herein can be learned from the claims, the features—by themselves and/or in combination—as disclosed by the claims, as well as by the following description of preferred examples of embodiment with reference to the drawings.

BRIEF DESCRIPTION OF THE DRAWINGS

They show.

DETAILED DESCRIPTION OF THE PREFERRED EMBODIMENTS

Figure 1:
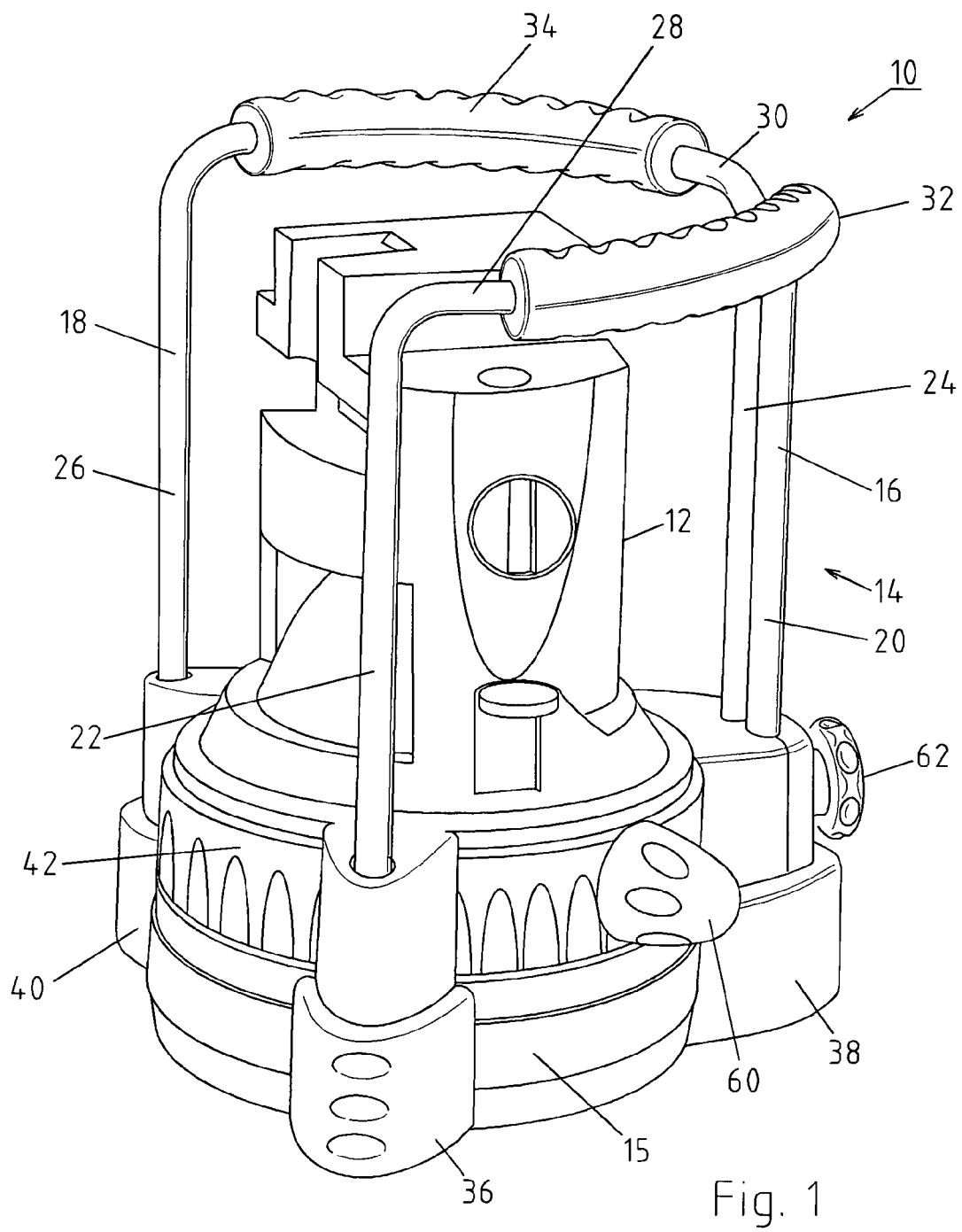
FIG. 1 a perspective illustration of a laser apparatus.

FIG. 1 shows a laser apparatus 10 in the form of embodiment of a construction laser apparatus—hereinafter referred to as a construction laser—which comprises a housing 12 accommodating a light-emitting laser. In order to protect housing 12, said housing is enclosed by a frame described as a receiving means 14 as shown by the example of embodiment of FIGS. 1 through 4, in order to protect housing 12 when construction laser 10 tips over, for example.

Receiving means 14 consists of a base plate 15 with U-shaped brackets 16, 18 extending from said base plate. In doing so, each bracket 16, 18 consists of two longitudinal legs 20, 22 and 24, 26, as well as of a transverse leg 28, 30 following a circular arc, whereby, in the example of embodiment, said legs are enclosed by shock-absorbing elements such as rubber elements 32, 34. Said elements themselves are structured and, consequently, may function as handles.

Support feet which, in turn, are also enclosed by shock-absorbing elements, such as rubber elements 36, 38, 40 extend from base plate 15 which consists of plastic material or a die-cast part. In addition, the support feet are connected with longitudinal legs 20, 22, 24, 26 of brackets 16, 18.

Furthermore, a mounting element, such as a threaded connection 41 for a stand, extends from base plate 15, namely from the center of said base plate. To do so, base plate 15 may itself comprise a base, or a frame acting as base plate 15, which is configured as a hollow cylinder with studs extending on the inside toward the center, in order to accommodate threaded connection 41 or an element performing the same function.

As illustrated by the drawings, brackets 16, 18 are arranged in such a manner that two longitudinal legs 20, 24 extend directly adjacent each other and form a pair of legs which extends along one of the edges of a three-square column or a roof prism. The remaining longitudinal legs 22, 26 extend along the other edges.

Figure 2:
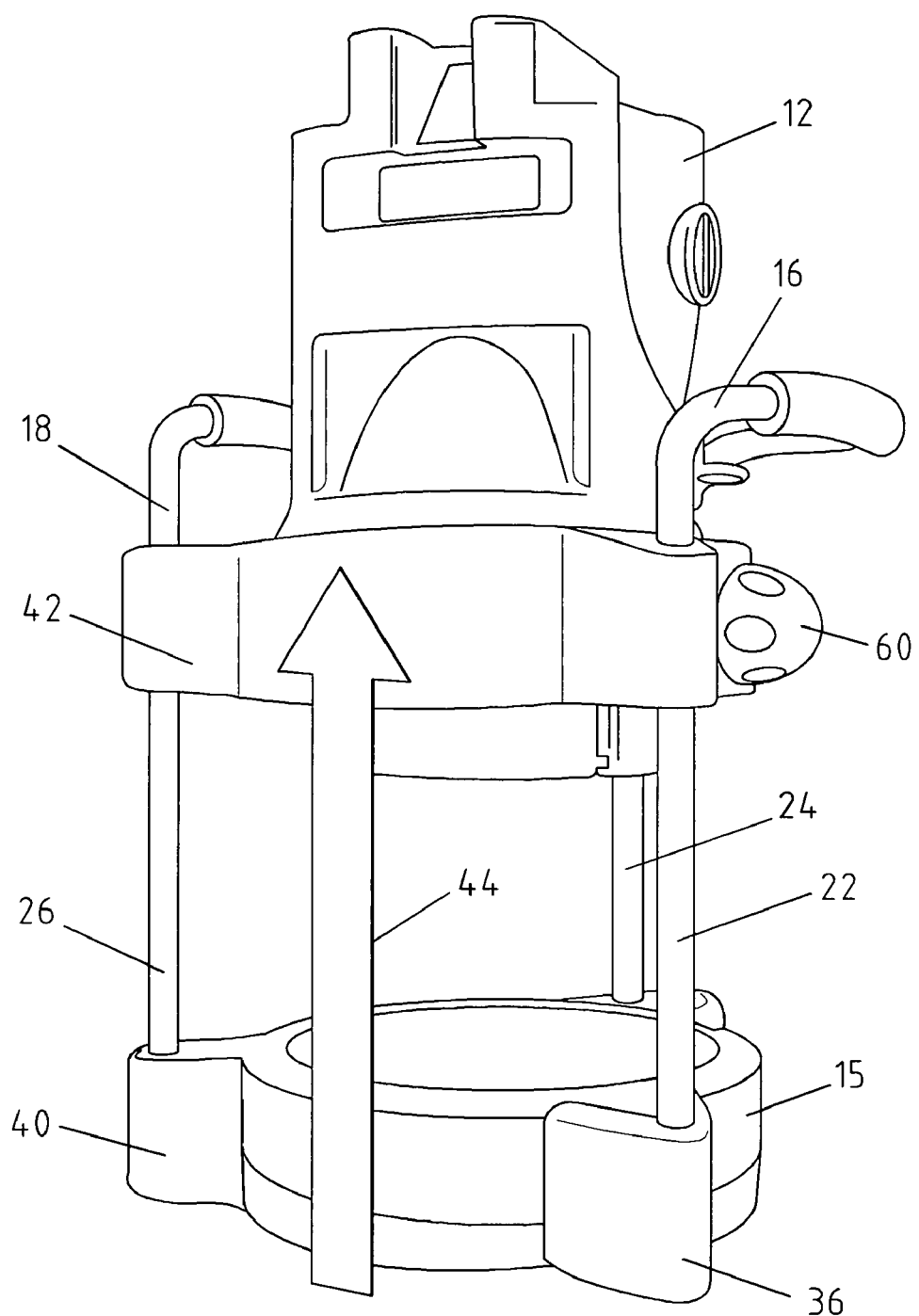
FIG. 2 the laser apparatus in accordance with FIG. 1, with the housing in a raised position.
Figure 3:
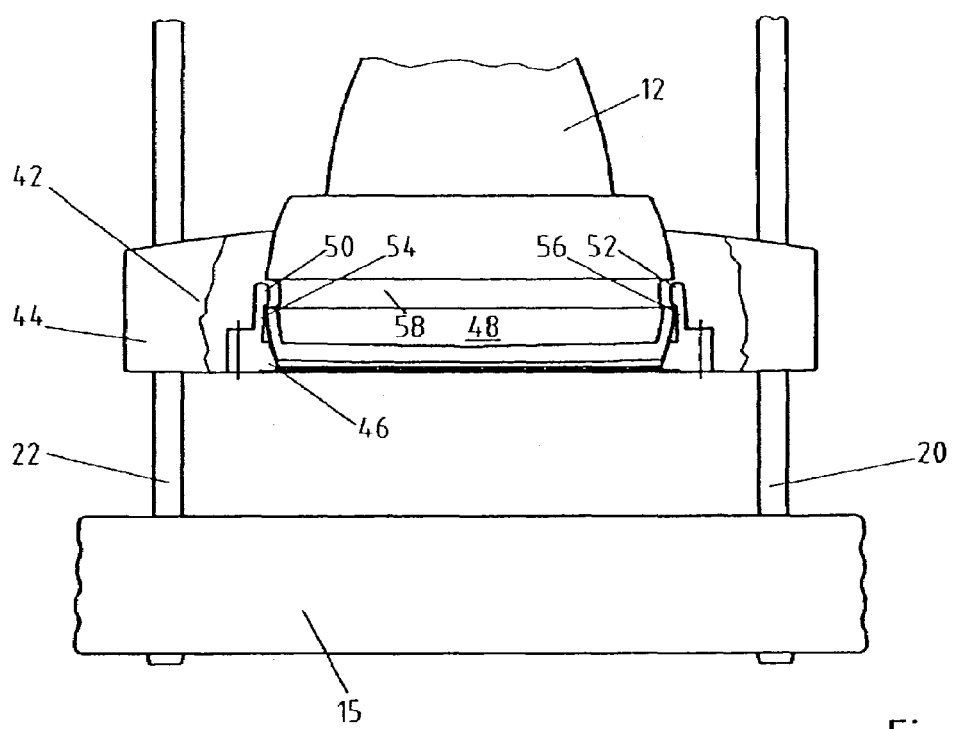
FIG. 3. a detail of the laser apparatus in accordance with FIGS. 1 and 2.
Figure 4:
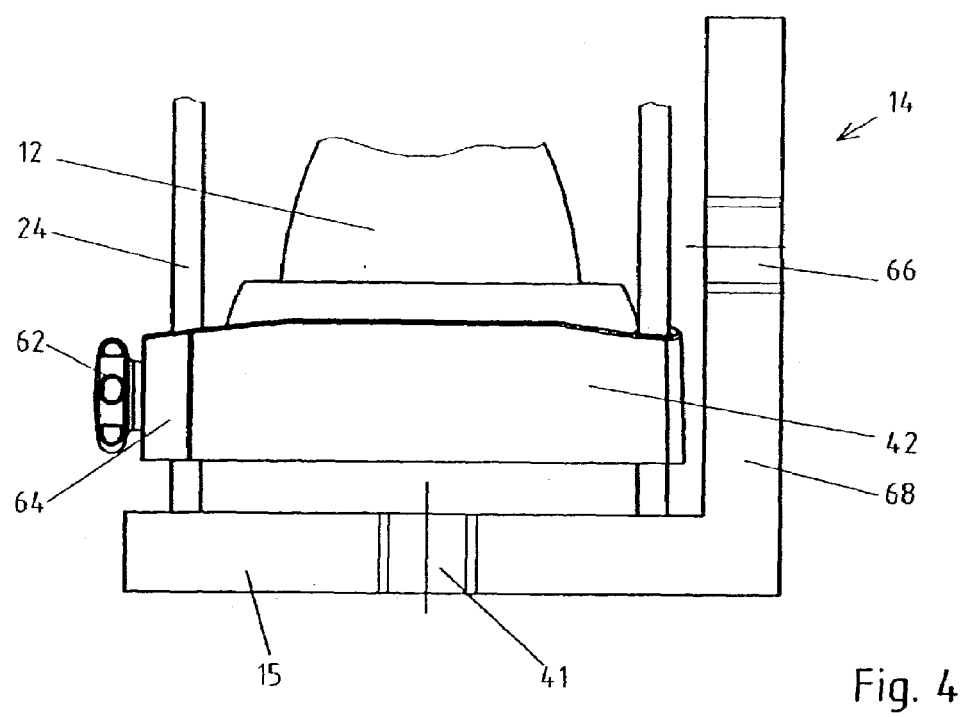
FIG. 4 another embodiment of the laser apparatus in accordance with FIGS. 1 through 3.

Longitudinal legs 22, 26 or leg pair 20, 24 extend through a support 42 which can be moved (arrow 44) along longitudinal legs 20, 22, 24, 26 as illustrated by FIG. 2. Mounting support 42, in turn, consists of an external section, forming a shell 44 and an insert 46 accommodated by the latter and forming an internal section, which, in turn accommodates housing 12 of the laser, i.e., a spherical section or cap-shaped section 48. The external geometric configuration of section 48 of housing 12 is adapted on the inside to insert 46, so that housing 13 can be tilted and/or pivoted or panned.

However, in order to permit the housing to rotate about its own axis—without superimposing a tilting operation—strip-shaped sections 54, 56 extending from insert 46 have nose-shaped projections 50, 52 which can come into engagement with a peripheral groove 58 in section 48 of housing 12. Sections 54, 56 are cutouts in insert 46 which are resilient in such a manner that, when housing 12 is tilted, nose-shaped projections 50, 52 may slide out of groove 58 without resulting in any damage.

Housing 12 may be fixed in position as desired by means of set screw 60 inserted in mounting support 42.

Mounting support 42, in turn, may be fixed in position relative to brackets 16, 18, i.e., relative to their directly adjacent longitudinal legs 22, 24, by means of set screw 62. This fixing in place is effected preferably by clamping, in that screw 62 is tightened to mounting support 42, whereby, at the same time, a clamping element 64, extending on the outside along longitudinal legs 22, 24, is pressed against said legs.

In one form of embodiment, receiving means 14 can be connected with a stand, for example, not only by means of internal thread 41 extending along the center of base plate 15, said internal thread's longitudinal axis coinciding with the longitudinal axis of receiving means 14, but also by means of another second internal thread 66 extending perpendicularly to internal thread 41, so that receiving means 14 can be aligned in vertical as well as in horizontal direction. Second internal thread 46, or a mounting means having the same function, extends preferably in an extension 68 of base plate 15, whereby said extension 68 extends parallel to the longitudinal axis of receiving means 14. Of course, it would also be possible to have the second internal thread start directly at base plate 15, in that said thread extends through the exterior wall. As a result of the fact that receiving means 14 can be arranged horizontally as well as vertically, housing 12 can be adjusted in vertical direction as well as in horizontal direction.

Figure 5:
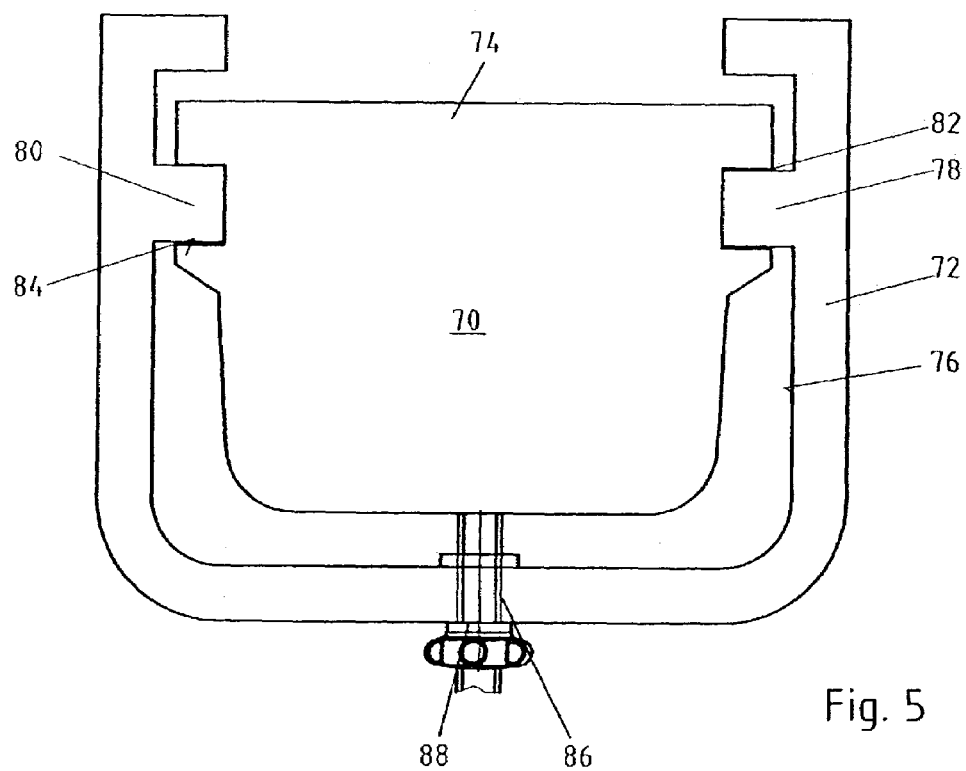
FIG. 5 a second example of embodiment of a laser apparatus.

FIG. 5 basically shows another form of embodiment of a receiving means 72 enclosing a housing 70 of a laser apparatus. In accordance with the example of embodiment of FIGS. 1 and 4, this receiving means 72 of FIG. 5 also encloses housing 70 on it periphery so that said housing is protected against outside influences, in particular against shock or against being dropped. If the receiving means in FIGS. 1 through 4 is a frame comprising brackets 16, 18 of steel, for example, receiving means 72 is made of a U-shaped structure consisting in particular of aluminum, as a result of which the periphery of housing 70 is covered completely or almost completely with the exception of the front side 74 where the laser light passes. In order to be able to move housing 70 in longitudinal direction along the longitudinal axis of the structural element or receiving means 72, stud-like projections 78, 80 extend from internal wall 76 of structural element 72, said projections coming into engagement with appropriately adapted longitudinal grooves 82, 84 of housing 70 of the laser. In order to fix housing 70 in place, a longitudinal hole 86 extends in structural element or receiving means 72, into which hole a locking element, such as a screw element 88, can be inserted and screwed to housing 70. Consequently, housing 70 also can be clamped in position relative to receiving means 72.

Instead of a structure having the geometric configuration of a U, it is of course possible to use a structure having the shape of an open hollow cylinder, for example, in order to function as a protection for housing 70.

Furthermore, structural element 72 comprises at its bottom at least one mounting element, such as an internal thread for a stand. Furthermore, support feet should extend from the base area which—in accordance with the explanations of FIG. 1—may be jacketed by a shock-absorbing material, such as rubber. Furthermore, the outside of structural element 72 may be provided with shock absorbers, such as rubber elements.

As an alternative to the form of embodiment shown by FIG. 5, a modified embodiment need not have studs 78 and 80. The clamping element is configured as a spherical section and, in doing so, the clamping operation and the tilt-angle adjustment are combined in one system, whereby the clamping operation could take place independently from the height adjustment or tilt-angle adjustment.

The invention claimed is:

1. Laser apparatus such as a construction laser apparatus comprising a light source accommodated inside a housing, characterized in that the housing (12) is enclosed by a receiving means (14) having a longitudinal axis, wherein said housing of the laser is adjustable along said longitudinal axis, wherein
    the receiving means (14) comprises a base plate (15) with a first mounting element for a support,
    wherein receiving means (14) further comprises at least one bracket (16, 18) extending from the base plate (15), and
    wherein the bracket (16, 18) has the geometric configuration of a U with lateral or longitudinal legs (20, 22, 24) extending from the base plate (15).

2. Laser apparatus according to claim 1, characterized in that the first mounting element has a first threaded connection or internal thread (41).

3. Laser apparatus according to claim 1, characterized in that the housing (12) is supported in a mounting support (42) which can be adjusted along the receiving means (14).

4. Laser apparatus according to claim 3 characterized in that the housing (12) is supported in the mounting support (42, 46) in such a manner that it can be tilted or pivoted or panned.

5. Laser apparatus according to claim 4, characterized in that the housing (12) has on its bottom an at least partially spherical or cap-shaped section (48) which is supported in an appropriately adapted cutout of the mounting support (42).

6. Laser apparatus according to claim 4, characterized in that the bracket (16, 18) is a handle.

7. Laser apparatus according to claim 1, characterized in that two brackets (16, 18) extend from the base plate (15).

8. Laser apparatus according to claim 1, characterized in that at least a transverse leg (28, 30) is enclosed by or comprises a shock-cushioning element.

9. Laser apparatus according to claim 7, characterized in that at least a transverse leg (28, 30) is enclosed by or comprises a shock-cushioning element.

10. Laser apparatus according to claim 1, characterized in that the support (42) for the housing can be guided to move along rods or longitudinal legs (20, 22, 24, 26) and can be fixed in position relative to the longitudinal legs.

11. Laser apparatus according to claim 1, characterized in that support feet of the receiving means (14) extend from the base plate (15).

12. Laser apparatus according to claim 1, characterized in that cushioning elements (36, 38) extend from the base plate (15).

13. Laser apparatus according to claim 12, characterized in that the cushioning elements (36, 38) enclose support feet of the receiving means (14).

14. Laser apparatus according to claim 12, characterized in that the cushioning elements are arranged in foot area of the rods or longitudinal legs (20, 22, 24, 26).

15. Laser apparatus according to claim 11, characterized in that the longitudinal legs (20, 22, 24, 26) represent the extensions of the support feet.

16. Laser apparatus according to claim 7, characterized in that one longitudinal leg (20) of the bracket (16) extends directly adjacent to one longitudinal leg (24) of the bracket (18).

17. Laser apparatus according to claim 16, characterized in that the adjacent longitudinal legs (20, 24) forming a pair of legs, as well as the longitudinal legs (22, 26), extend along the edges of a three-square column.

18. Laser apparatus according to claim 1, characterized in that the receiving means creates a peripheral cylindrical surface with projections configured as cushioning elements (36, 38, 40) that extend beyond said cylindrical surface.

19. Laser apparatus according to claim 17, characterized in that a mounting support (42) for the housing (12) can be fixed in position—by means of a locking element (62)—relative to the adjacent longitudinal legs (20, 24).

20. Laser apparatus according to claim 3, characterized in that the support (42) has the shape of a plate.

21. Laser apparatus according to claim 3, characterized in that the mounting support (42) consists of a shell having the form of a hollow cylinder representing the external section (44), and of an insert (46) accommodating the housing (12) representing the internal section.

22. Laser apparatus according to claim 21, characterized in that the insert (46) comprises projections (50, 52) which extend in the direction of the housing (12) to come into engagement with one at least partially peripheral recess (58) of the spherical or cap-shaped section (58) of the housing (12).

23. Laser apparatus according to claim 22, characterized in that the projections (50, 52) extend from stud-shaped or stripshaped sections (54, 56) of the insert (46) along the direction of the longitudinal axis of the receiving means (14).

24. Laser apparatus according to claim 23, characterized in that the stud-shaped or strip-shaped sections (54, 56) are cutouts of the insert (46).

25. Laser apparatus according to claim 1, characterized in that the base plate (15) is configured as a hollow cylinder or as a circular disk.

26. Laser apparatus according to claim 1, characterized in that two mounting elements (41, 66) for a support extend from the base plate (15), in which case the first mounting element (41) extends parallel to the adjustment direction of the housing (16) and the second mounting element (66) extends perpendicular to said adjustment direction.

27. Laser apparatus according to claim 26, characterized in that the first mounting element extends from a base section of the base plate (15) and that the longitudinal axis of the receiving means (14) passes through said first mounting element, whereby the longitudinal axis of said receiving means coincides or almost coincides with the longitudinal axis of the housing (12) when said housing is not tilted.

28. Laser apparatus according to claim 26, characterized in that the second mounting element extends in an extension (68) extending from the base plate (15).

29. Laser apparatus according to claim 26, characterized in that the second mounting element (66) comprises a threaded connection or internal thread.

30. Laser apparatus such as a construction laser apparatus comprising a light source accommodated inside a housing, characterized in that the housing (70) is enclosed by a receiving means (72) having a longitudinal axis, wherein said housing of the laser is adjustable along said longitudinal axis, that the receiving means (72) is an element which partially encloses the housing (70) of the laser apparatus and has the geometric configuration of a U or of a peripherally open section of a hollow cylinder, that guides for the housing (70) extend from the internal wall of a U-shaped structural element, and that the guide is configured as a stud-shaped projection (78, 80) which comes into engagement with appropriately adapted cutouts (82, 84) of the housing (70).

31. Laser apparatus according to claim 30, characterized in that the receiving means (72) is a U-shaped aluminum structural element.

32. Laser apparatus according to claim 30, characterized in that the U-shaped structural element comprises as the receiving means (72) a longitudinal hole extending in longitudinal direction, whereby a locking element (88) for the housing (70) engages in said hole.

33. Laser apparatus according to claim 30, characterized in that the receiving means (14, 72) encloses the housing (12, 70) at least in some areas in a coaxial or in an approximately coaxial direction.

* * * * *